US012586705B2

(12) United States Patent
Hall, Jr. et al.

(10) Patent No.: US 12,586,705 B2
(45) Date of Patent: Mar. 24, 2026

(54) DIVERTER DEVICE FOR TRANSFORMER FLUIDS

(71) Applicant: Arch LLC of Georgia, Douglasville, GA (US)

(72) Inventors: Charles Arthur Hall, Jr., Douglasville, GA (US); Richard Brandon Hall, Carrollton, GA (US); Samuel Luke Hall, Douglasville, GA (US)

(73) Assignee: Arch LLC of Georgia, Douglasville, GA (US)

( * ) Notice: Subject to any disclaimer, the term of this patent is extended or adjusted under 35 U.S.C. 154(b) by 0 days.

(21) Appl. No.: 18/538,997

(22) Filed: Dec. 13, 2023

(65) Prior Publication Data

US 2025/0201463 A1 Jun. 19, 2025

(51) Int. Cl.
*H01F 27/02* (2006.01)

(52) U.S. Cl.
CPC .................................... *H01F 27/02* (2013.01)

(58) Field of Classification Search
CPC ... H01F 27/02; Y10T 137/5762; B65B 39/00; B67C 11/00; B67C 11/02
USPC .......................................................... 184/106
See application file for complete search history.

(56) References Cited

U.S. PATENT DOCUMENTS 3,354,989 A * 11/1967 Anderson ............. F16N 31/006 180/69.1
4,695,088 A * 9/1987 Jensen .................. F16N 31/006 180/69.1
6,212,742 B1 * 4/2001 Baskin .................. F16L 3/1058 24/457
10,676,335 B1 * 6/2020 Sickler .................... B67C 11/02
11,655,938 B1 * 5/2023 Hamel .................. F16N 19/003 123/198 E
12,031,672 B1 * 7/2024 Crater ................ F01M 11/0408
2001/0045324 A1 * 11/2001 Harding, Jr. .......... F16N 31/002 184/106
2007/0272302 A1 * 11/2007 Carter .................... A47B 97/00 137/312
2015/0274499 A1 * 10/2015 Simpson ................. B67C 11/02 141/332

FOREIGN PATENT DOCUMENTS

DE 10261485 A1 * 8/2004 ........... H01F 27/321
WO WO-9508031 A1 * 3/1995 ................ E03F 5/16

* cited by examiner

*Primary Examiner* — Jessica Cahill
(74) *Attorney, Agent, or Firm* — Thomas | Horstemeyer, LLP

(57) ABSTRACT

The present disclosure describes systems and methods for diverting transformer fluid within a transformer station. One such diverter device comprises a horizontal bottom surface for collecting transformer fluid; a bottom-sloped surface joined to the horizontal bottom surface, wherein the bottom-sloped surface slopes at an angle relative to the horizontal bottom surface; a back sidewall, a first sidewall, and a second sidewall, each of which border the horizontal bottom surface to aid in collecting the transformer fluid; a first sloped-sidewall and a second sloped-sidewall that border opposing sides of the bottom-sloped surface to aid in guiding the transformer fluid down the bottom-sloped surface; and a plurality of magnetic mount structures that are affixed or embedded in the first sidewall and the first sloped-sidewall.

17 Claims, 8 Drawing Sheets

DIVERTER DEVICE FOR TRANSFORMER FLUIDS

TECHNICAL FIELD

The present disclosure is generally related to a device for diverting transformer fluids that leak or overflow from within a pad mounted transformer.

BACKGROUND

A transformer station comprises a transformer housing in which are disposed a fuse and a cable interface. For example, bayonet-style circuit breakers or fuses (e.g., expulsion fuses) serve to protect the transformer station from overload (or transformer failure) resulting in a short circuit. Bayonet-style fuses are designed to operate under transformer oil (or other type of transformer fluid) and be replaceable after operation. However, when the fuse is removed, the transformer fluid often escapes from the opening of a fuse holder causing possible damage to rubber termination or the cable interface components mounted onto the transformer front plate. Additionally, transformer fluid can leak from the fuse holder opening for other reasons, such as deterioration of the fuse seal (e.g., from aging, premature failure, etc.) or thermal overloading (resulting in increased pressure within the fuse holder), among others, which can all contribute to the development of a transformer leak at the bayonet fuse housing.

Consequently, devices for capturing the transformer fluid that escapes the confines of the transformer tank have been designed and implemented to alleviate the problems resulting from dripping fluid. Such devices usually are mounted to the upper end of the fuse holder just outside the wall of the transformer to prevent dripping of oil or other transformer fluids onto critical power components of the transformer station. However, a problem with the existing fluid-capturing devices is that they eventually fill up and overflow resulting in the transformer fluid dripping onto critical power components, such as bushing and elbow assemblies, which can cause these parts to fail prematurely.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In various embodiments, the present disclosure provides a diverter device for transformer fluids and related methods. To aid in preventing leakage and overflows from transformer fuse holders and/or fluid-capturing devices, such as drip trays, embodiments of a diverter device provides a mechanism for directing fluids away from critical power components of a transformer station, such as bushing and elbow assemblies. In accordance with the present disclosure, such a device may be removably attached to an inside tank wall or plate of the transformer station. Accordingly, in various embodiments, the diverter device may be attached using one or more magnetic mount structures or other type of fastening mechanisms, such as an adhesive tape or clamps, among others. Thus, the diverter device allows for easy installation and removal for regular transformer maintenance.

Figure 1:
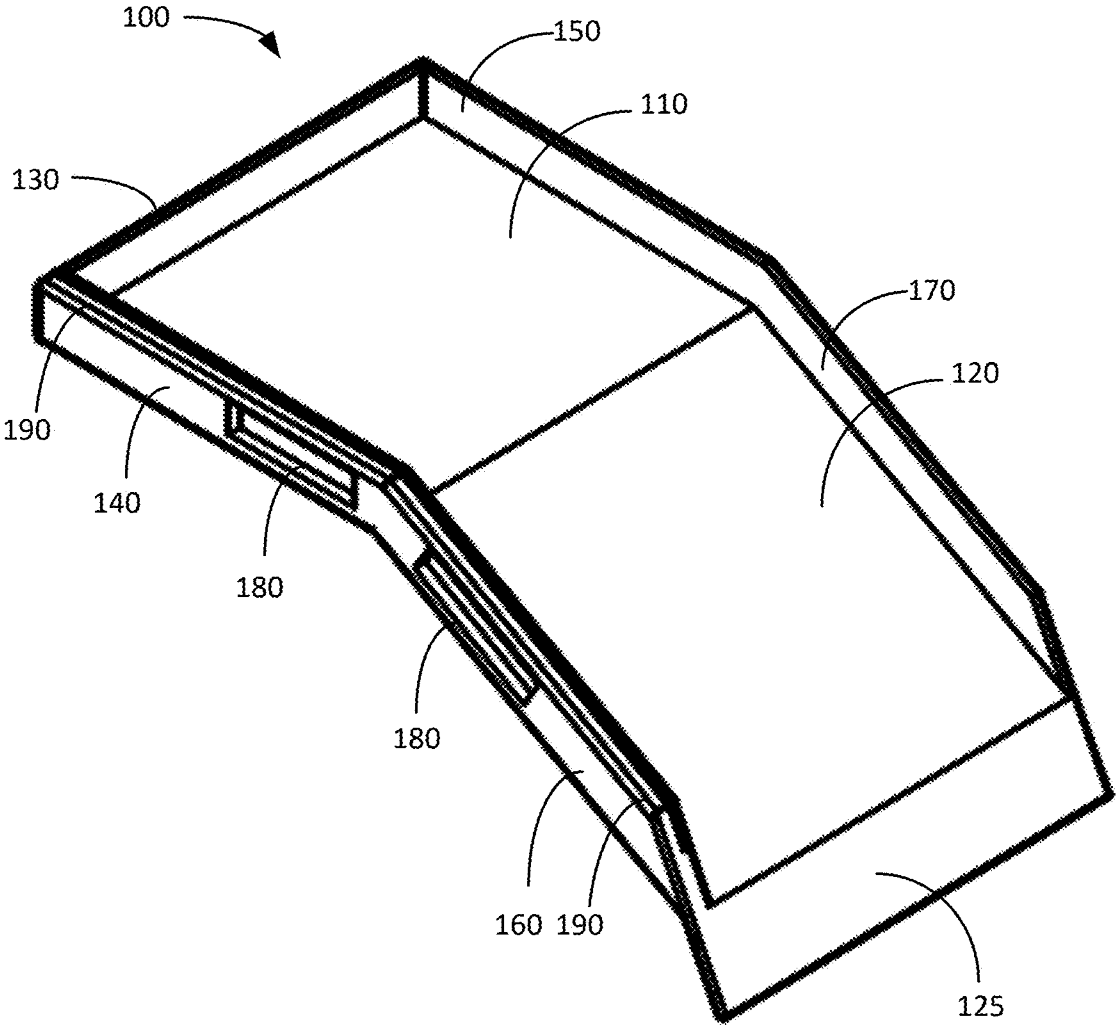
FIG. 1 is a perspective view of an embodiment of a diverter device for transformer fluids in accordance with embodiments of the present disclosure.
Figure 2:
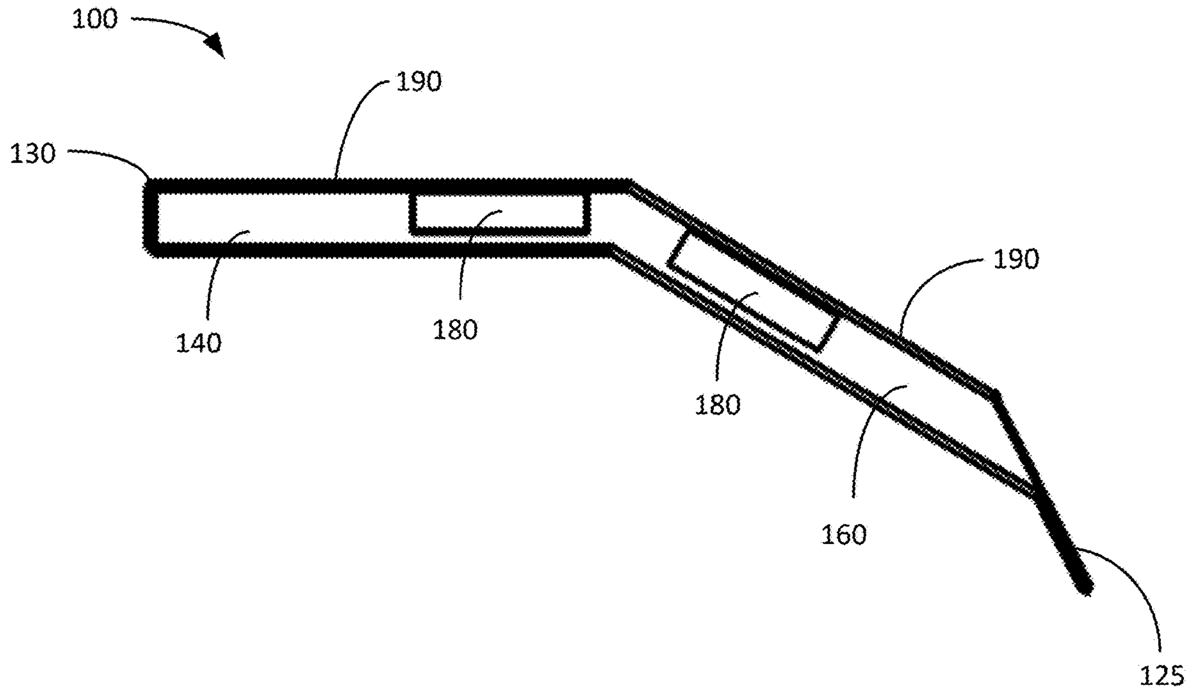
FIG. 2 is a side view of an embodiment of a diverter device for transformer fluids in accordance with embodiments of the present disclosure.
Figure 3:
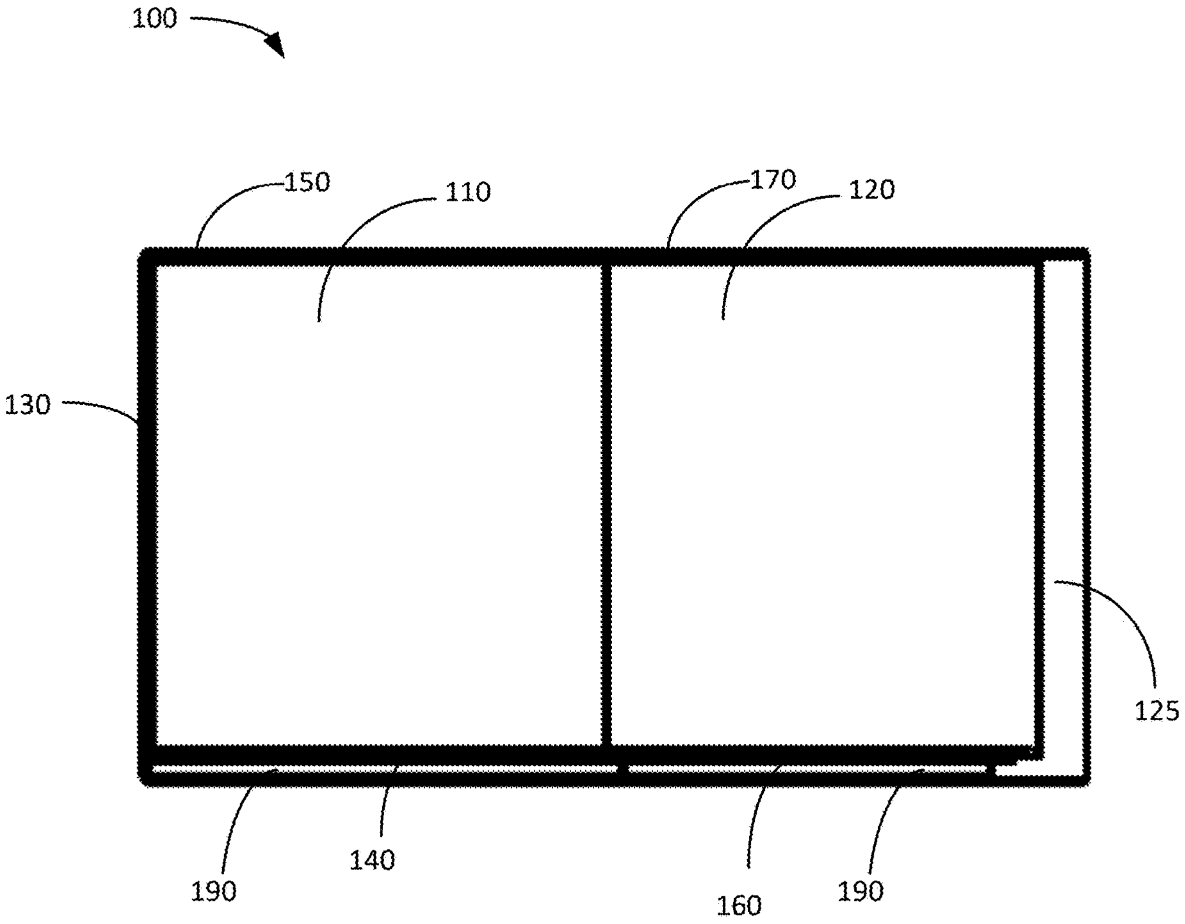
FIG. 3 is a top view of an embodiment of a diverter device for transformer fluids in accordance with embodiments of the present disclosure.
Figure 4:
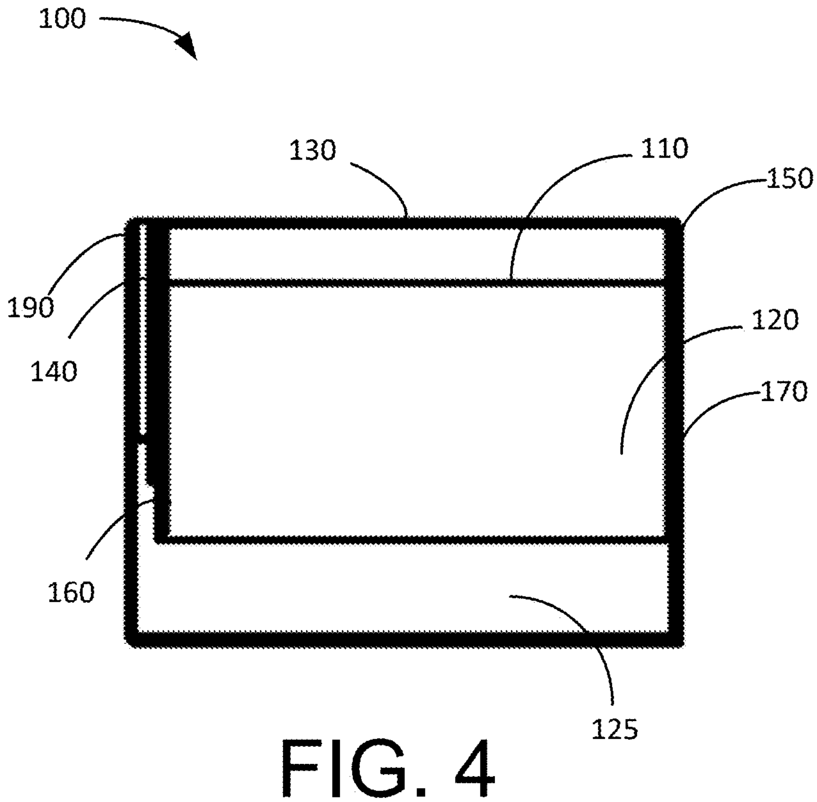
FIG. 4 is a front view of an embodiment of a diverter device for transformer fluids in accordance with embodiments of the present disclosure.

Referring now to FIGS. 1-4, a perspective view of an embodiment of the diverter device 100 is shown in FIG. 1, a side view is shown in FIG. 2, a top view is shown in FIG. 3, and a front view is shown in FIG. 4. As shown in the figures, the diverter device 100 comprises a horizontal bottom surface 110, which can have a rectangular shape, that can collect transformer fluid and guide or move the transformer fluid down a bottom-sloped surface 120, where the collected transformer fluid can be deposited onto the ground or floor surface of the transformer station. Accordingly, a length of a footprint of the horizontal bottom surface 110 and the bottom-sloped surface 120 exceeds at least a width of footprint of the power component(s) that may be disposed under it when mounted on a tank wall of the transformer station. As such, the diverter device 100 comprises an impermeable surface that moves the transformer oil or other fluid away from the power component(s) under it that leaks from the transformer fuse holder(s) above it.

In various embodiments, the bottom-sloped surface 120 is sloped or inclined at an angle relative to the horizontal bottom surface 110, such as but not limited to an angle that is about 150 degrees, angle that is greater than 90 degrees and less than 180 degrees, etc. Accordingly, when the diverter device 100 is positioned over power components of the transformer station, the diverter device 100 can prevent the collected transformer fluid from being deposited onto the power components and can guide/direct the transformer fluids to fall on the ground within an area that is away from the power components. Since the transformer oil used in modern distribution transformers is environmentally friendly and biodegradable, this allows the oil to be diverted away from critical power components and to the ground inside the transformer without causing a hazard to the environment. To aid in guiding in the collected transformer fluid to a desired location, various embodiments of the diverter device 100 also include an angled end surface 125 that is joined to the bottom-sloped surface 120 and has an incline or sloped surface at an angle that is greater than 90 degrees with respect to the bottom-sloped surface 120. Thus, the transformer fluids falling off the end surface 125 will drop in a vertically downward direction resulting in less spillage area on the ground.

As shown in the figures, the diverter device 100 further comprises a back sidewall 130, a first sidewall 140, and a second sidewall 150 that border the horizontal bottom surface 110. In various embodiments, the junction of the sidewalls to the bottom surface can comprise an angle that is or is approximately 90 degrees. Correspondingly, the diverter device 100 further comprises a first sloped-sidewall 160 and a second sloped-sidewall 170 that border opposing sides of the bottom-sloped surface 120. For the perspective view shown in FIG. 1, the first side wall 140 and the first sloped-sidewall 160 are on the left side of the diverter device 100 and the second side wall 150 and the second sloped-sidewall 170 are on the right side of the diverter device 100.

In various embodiments, the diverter device 100 has one or more magnetic mount structures 180 (e.g., round magnetic discs, rectangular magnetic strips, etc.) that are affixed or embedded in a first/second sidewall 140, 160 of the diverter device and a first/second sloped-sidewall 150, 170, as shown in the figures, so that the diverter device can be 100 attached magnetically to an inside tank wall of the transformer station. In various embodiments, the magnetic holding strength for the mount structures 180 is about 40 pounds, where the diverter device 100 can be positioned over the top of primary elbow assemblies (or other power components) of the transformer station, and below the bayonet fuse holder and/or below a drip tray of the bayonet fuse holder.

As transformers age and are subject to heat and thermal overloading, the tank wall can swell, creating an uneven surface. Thus, in various embodiments, the sidewalls of the diverter device 100 (e.g., first sidewall 140 and first sloped-sidewall 160) that are affixed with the magnetic mount structures 180 is also affixed with a rubber edge strip (not shown) that extends along a top groove 190 of the sidewalls, which can create a seal with the tank wall, once mounted, to divert transformer fluid regardless tk the condition of the tank wall of the transformer station. In various embodiments, the magnetic mount structures 180 and/or the top groove 190 may be located on only one side of the diverter device 100. Alternatively, in various embodiments, the magnetic mount structures 180 and/or the top grove 190 may be located on both sides of the diverter device 100 to provide additional options on how the diverter device can be mounted on the tank wall of the transformer station. In various embodiments, the magnet mount structures 180 are center mounted on the sidewall surfaces of the device so that, in the event that there is an uneven mounting surface, the air gaps covered by the rubber edge strip will be evenly distributed along a length of the diverter device 100.

Figure 5:
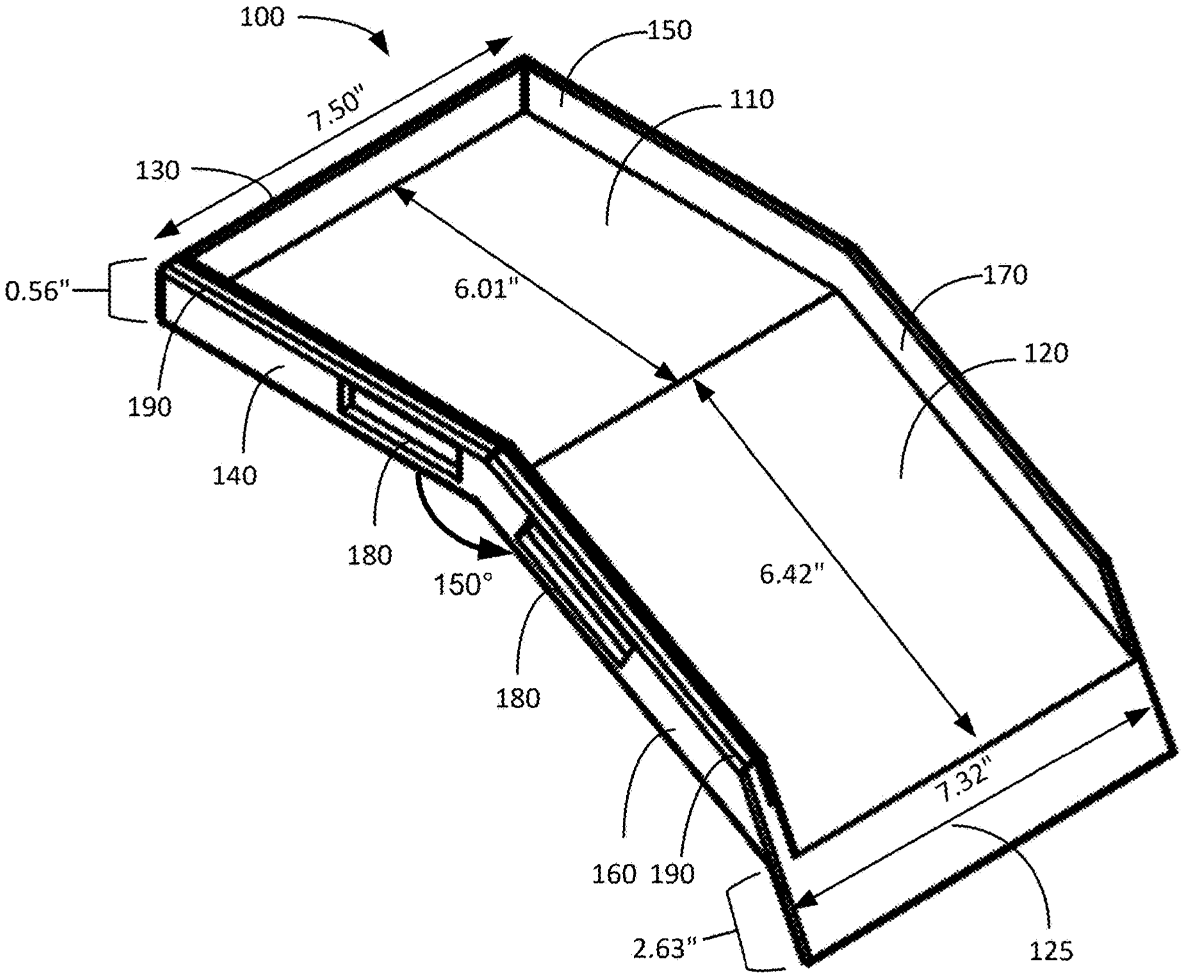
FIG. 5 is a perspective view of an embodiment of a diverter device for transformer fluids with exemplary dimensions in accordance with embodiments of the present disclosure.

In various embodiments, dimensions and sizes of the various components of the diverter device 100 can be adapted to fit and accommodate the various types and sizes of transformer stations that are in use. In a non-limiting example, FIG. 5 shows exemplary dimensions for a non-limiting and possible use case. In this example, the horizontal bottom surface 110 is approximately 7.32 inches wide× 6.01 inches long (e.g., 7-8 inches×6-7 inches), the bottom-sloped surface 120 is approximately 7.32 inches wide×6.42 inches long (e.g., 7-8 inches×6-7 inches), the end surface 125 is approximately 7.32 inches wide×2.63 inches long, the top groove 190 is approximately 0.37 inches×0.06 inches deep in a top of the sidewalls, and the magnetic mount structures are approximately 2.44 inches×0.56 inches in size.

In various embodiments, the diverter device 100 is formed from plastic molding that is manufactured to prevent breakage considering the strength of the magnets and typical pulling force to remove the device. In these or other embodiments, the diverter device 100 can be made of other types of rigid structures with material composition of steel, aluminum, ceramic, metal alloy or made with materials such as plastic, polyethylene polymer resins, PET-film, polystyrene, polypropylene, etc.

Figure 6:
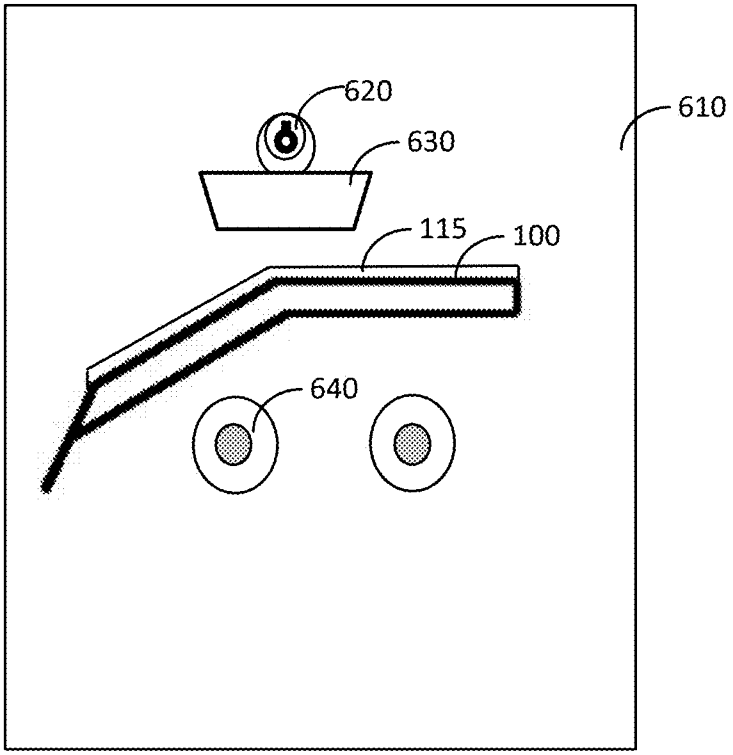
FIG. 6 is a line drawing of a transformer station and drip diverter device assembly in accordance with various embodiments of the present disclosure.
Figure 7:
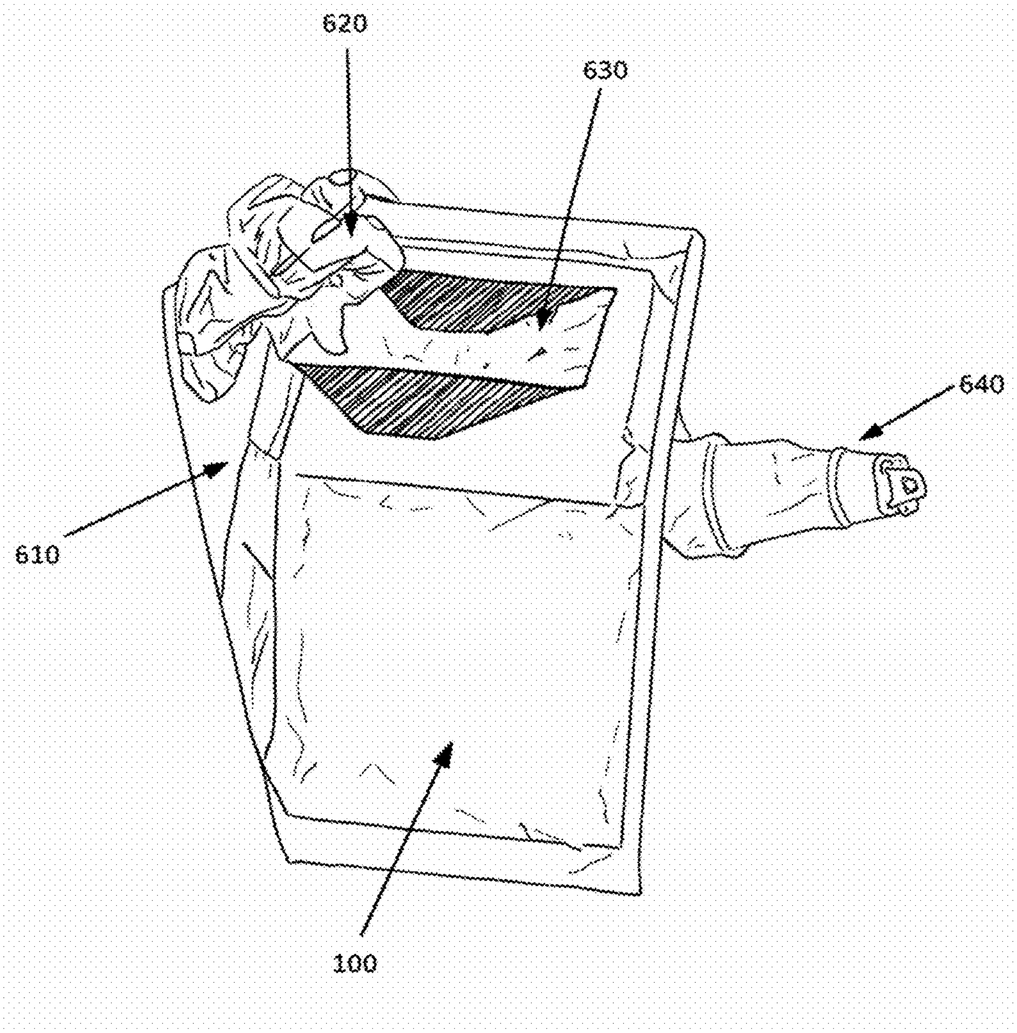
FIG. 7 is a computer-aided sketch of a transformer station and drip diverter device assembly in accordance with various embodiments of the present disclosure.

In operation, the diverter device 100 can be mounted to a tank wall 610 of a pad mounted transformer station. Accordingly, FIG. 6 shows a line drawing and FIG. 7 shows a computer-aided sketch of a transformer station and drip diverter device assembly, in accordance with various embodiments of the present disclosure. The transformer station is a junction point of transmission of electricity and distribution in electric power system. As such, the transformer station comprises a transformer tank or housing in which are disposed one or more fuses and power components (e.g., cable interface) in which the power components are situated under the one or more fuses). Accordingly, the diverter device 100 can be mounted and used to divert transformer fluid that is leaking from a holder 620 for a bayonet fuse (e.g., expulsion fuse) or that overflows from a bayonet fuse drip tray 630. In various embodiments, a rubber edge strip 115 is provided to form a seal with the tank wall 610 after the diverter device 100 is mounted or attached to the tank wall 610, thereby providing the capability to divert transformer fluid regardless tk the condition of the tank wall of the transformer station. Therefore, this device can be used to divert transformer fluid away from cable interface components, such as an elbow connector 640 that is a plug-in termination for underground power cables. In various embodiments, the diverter device 100 is magnetically attached to a metallic tank wall 610 and is mounted over the elbow connector 640 and below the bayonet fuse drip tray 630. Unlike the bayonet fuse drip tray 630, the diverter device 100 is not intended to catch and retain leaking transformer fluid but to divert the leaking fluid away from the elbow connector 640 (or other power components) below the fuse holder 620. Thus, in embodiments where the bayonet fuse drip tray 630 is optionally installed to catch and retain the leaking transformer fluid from the bayonet fuse holder 620 but is overfilled and cannot retain all of the transformer fluid, the diverter device 100 is designed to redirect the leaking fluid around the elbow connector 640 to the ground of the transformer station. Further, since the transformer fluid (e.g., transformer oil) used in modern distribution transformers is environmentally friendly and biodegradable, this allows the transformer fluid to be diverted away from critical power components and to the ground inside the transformer without causing a hazard to the environment.

Figure 8:
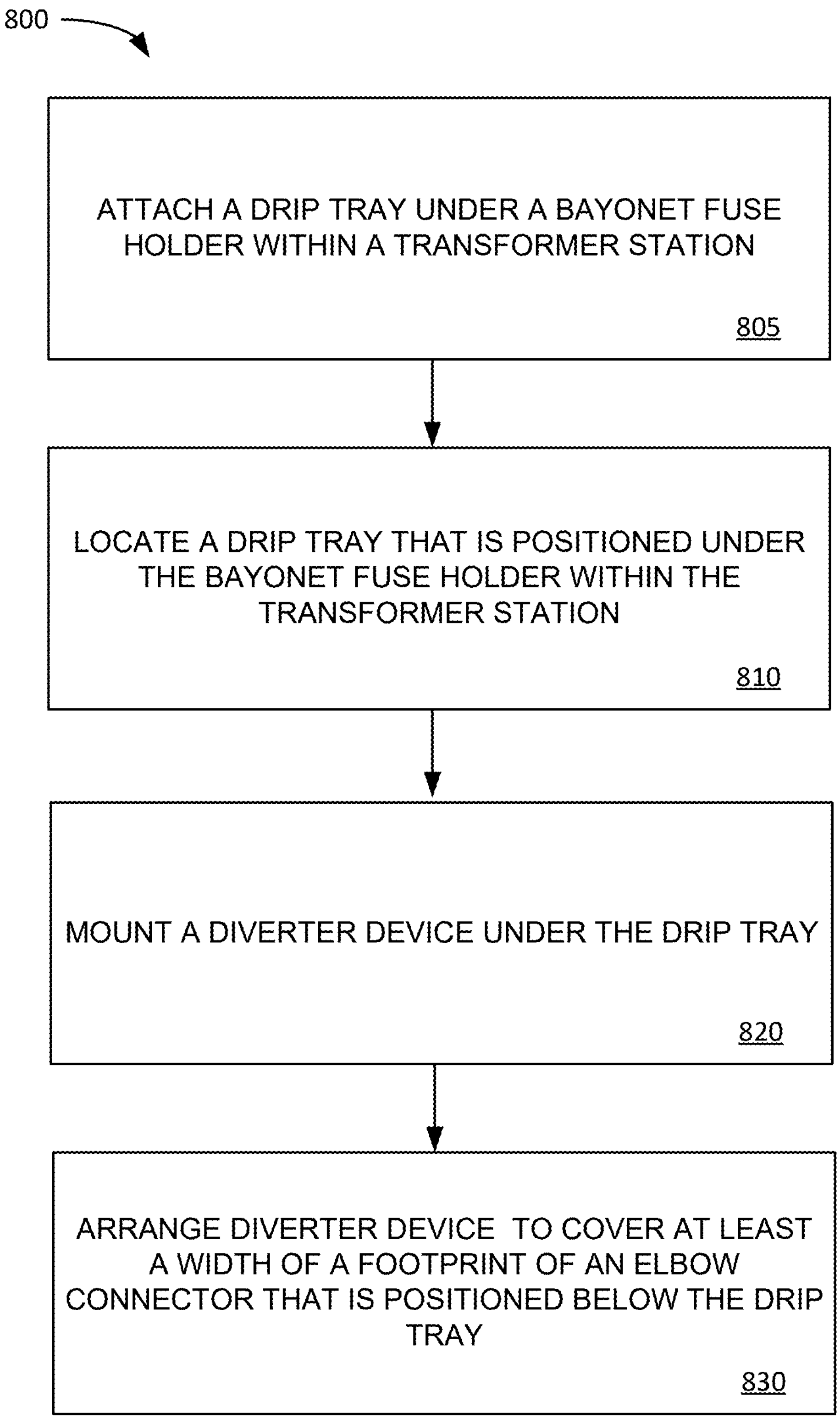
FIG. 8 is a flow chart diagram illustrating an exemplary method for implementing a diverter device on a tank wall of a transformer station in accordance with embodiments of the present disclosure.

In certain embodiments, the present disclosure provides for methods for implementing a diverter device 100 on a tank wall 610 of a transformer station. Referring now to FIG. 8, in one exemplary method 800, the method comprises the act of attaching (805) a drip tray 630 under a bayonet fuse holder 620 within the transformer station. The method further comprises locating (810) the drip tray 630 and mounting (820) a diverter device 100 of the present disclosure under the drip tray 630, such as by magnetically or adhesively affixing the diverter device to a tank wall of the transformer station, whereby the diverter device 100 is arranged (830) or positioned to cover a width of a footprint of an elbow connector 640 that is positioned below the drip tray 630. In this manner, any drippage of transformer fluids from the bayonet fuse holder 620 or the drip tray 630 is prevented from being deposited on the elbow connector 640, thereby avoiding possible damage to the elbow connector 640 (and any other power components positioned under the diverter device 100).

It should be appreciated that various sizes, dimensions, contours, rigidity, shapes, flexibility and materials of any of the components or portions of components in the various embodiments discussed throughout may be varied and utilized as desired or required. It should be appreciated that while some parameters or dimensions are provided on the aforementioned figures, the device may constitute various sizes, dimensions, contours, rigidity, shapes, flexibility and materials as it pertains to the components or portions of components of the device, and therefore may be varied and utilized as desired or required. It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. In general, the term "about" or "approximately" is used herein to modify a numerical value above and below the stated value by a variance of 10%. In one aspect, the term "about" or "approximately" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about" or "approximately." When such a range is expressed, other exemplary embodiments include from the one particular value and/or to the other particular value. In describing example embodiments, terminology will be resorted to for the sake of clarity. It is intended that each term contemplates its broadest meaning as understood by those skilled in the art and includes all technical equivalents that operate in a similar manner to accomplish a similar purpose.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure and protected by the following claims.

Therefore, at least the following is claimed:

1. A system for diverting transformer fluid comprising:

a diverter device comprising:

a horizontal bottom surface for collecting transformer fluid;

a bottom-sloped surface joined to the horizontal bottom surface, wherein the bottom-sloped surface slopes at a first angle that is greater than 100 degrees and less than 170 degrees relative to the horizontal bottom surface;

a back sidewall, a first sidewall, and a second sidewall, each of which border the horizontal bottom surface to aid in collecting the transformer fluid;

a first sloped-sidewall and a second sloped-sidewall that border opposing sides of the bottom-sloped surface to aid in guiding the transformer fluid down the bottom-sloped surface;

a plurality of magnetic mount structures that are affixed or embedded in the first sidewall and the first sloped-sidewall; and an end surface that is joined to an end of the bottom-sloped surface opposite of an end of the bottom-sloped surface that is joined to the horizontal bottom surface, wherein the end surface has a sloped surface at an angle that is greater than 90 degrees with respect to the bottom-sloped surface.

2. The system of claim 1, wherein a junction of each of the back sidewall, first sidewall, and second sidewall comprises an approximate 90 degree angle.

3. The system of claim 1, wherein the diverter device is formed from an impermeable material.

4. The system of claim 3, wherein the diverter device is formed from plastic molding.

5. The system of claim 1, wherein the first sidewall features a first groove extending a length of the first sidewall and a rubber edge strip secured to the first sidewall via the first groove.

6. The system of claim 5, wherein the first sloped-sidewall features a second groove extending a length of the first sloped-sidewall, wherein the rubber edge strip is secured to the first sloped-sidewall via the second groove.

7. The system of claim 1, wherein the horizontal bottom surface is approximately 7 inches wide×6 inches long and the bottom-sloped surface is approximately 7 inches wide×6 inches long.

8. A system for diverting transformer fluid comprising:

a diverter device comprising:

a horizontal bottom surface for collecting transformer fluid;

a bottom-sloped surface joined to the horizontal bottom surface, wherein the bottom-sloped surface slopes at a first angle that is greater than 100 degrees and less than 170 degrees relative to the horizontal bottom surface;

a back sidewall, a first sidewall, and a second sidewall, each of which border the horizontal bottom surface to aid in collecting the transformer fluid;

a first sloped-sidewall and a second sloped-sidewall that border opposing sides of the bottom-sloped surface to aid in guiding the transformer fluid down the bottom-sloped surface;

a plurality of magnetic mount structures that are affixed or embedded in the first sidewall and the first sloped-sidewall, wherein a length of a footprint of the horizontal bottom surface and the bottom-sloped surface exceeds a width of footprint of an elbow connector of a transformer station;

the system further comprising a drip tray attached to a bayonet fuse holder of the transformer station, wherein the diverter device is mounted under the drip tray and over the elbow connector of the transformer station, wherein the diverter device is positioned to direct leaking fluids from the drip tray around the elbow connector to a ground of the transformer station.

9. A method comprising:

attaching a drip tray under a bayonet fuse holder within a transformer station; and mounting a diverter device under the drip tray, whereby a footprint of the diverter device is positioned to cover at least a width of a footprint of an elbow connector that is positioned below the drip tray, wherein the diverter device comprises:

a horizontal bottom surface for collecting transformer fluid;

a bottom-sloped surface joined to the horizontal bottom surface, wherein the bottom-sloped surface slopes at a first angle that is greater than 100 degrees and less than 170 degrees relative to the horizontal bottom surface;

a back sidewall, a first sidewall, and a second sidewall, each of which border the horizontal bottom surface to aid in collecting the transformer fluid;

a first sloped-sidewall and a second sloped-sidewall that border opposing sides of the bottom-sloped surface to aid in guiding the transformer fluid down the bottom-sloped surface;

a plurality of magnetic mount structures that are affixed or embedded in the first sidewall and the first sloped-sidewall; and an end surface that is joined to an end of the bottom-sloped surface opposite of an end of the bottom-sloped surface that is joined to the horizontal bottom surface, wherein the end surface has a sloped surface at an angle that is greater than 90 degrees with respect to the bottom-sloped surface.

10. The method of claim 9, further comprising:

causing transformer fluid to leak from the bayonet fuse holder; and guiding, via the diverter device, the transformer fluid to a ground of the transformer station while avoiding the elbow connector.

11. The method of claim 10, wherein the transformer fluid is caused to leak by replacing a fuse in the bayonet fuse holder.

12. The method of claim 9, wherein the transformer fluid is a biodegradable oil.

13. The method of claim 9, wherein a junction of each of the back sidewall, first sidewall, and second sidewall comprises an approximate 90 degree angle.

14. The method of claim 9, wherein the diverter device is formed from an impermeable material.

15. The method of claim 9, wherein the first sidewall features a first groove extending a length of the first sidewall and a rubber edge strip secured to the first sidewall via the first groove.

16. The method of claim 15, wherein the first sloped-sidewall features a second groove extending a length of the first sloped-sidewall, wherein the rubber edge strip is further secured to the first sloped-sidewall via the second groove.

17. A method comprising:

attaching a drip tray to a bayonet fuse holder within a transformer station; and mounting a diverter device under the drip tray and over an elbow connector of the transformer station, wherein the diverter device is positioned to direct leaking fluids from the drip tray around the elbow connector to a ground of the transformer station, wherein the diverter device comprises:

a horizontal bottom surface for collecting transformer fluid;

a bottom-sloped surface joined to the horizontal bottom surface, wherein the bottom-sloped surface slopes at a first angle that is greater than 100 degrees and less than 170 degrees relative to the horizontal bottom surface;

a back sidewall, a first sidewall, and a second sidewall, each of which border the horizontal bottom surface to aid in collecting the transformer fluid;

a first sloped-sidewall and a second sloped-sidewall that border opposing sides of the bottom-sloped surface to aid in guiding the transformer fluid down the bottom-sloped surface; and a plurality of magnetic mount structures that are affixed or embedded in the first sidewall and the first sloped-sidewall, wherein a length of a footprint of the horizontal bottom surface and the bottom-sloped surface exceeds a width of a footprint of the elbow connector of the transformer station.

* * * * *